(12) United States Patent
Koorapaty et al.

(10) Patent No.: US 6,289,211 B1
(45) Date of Patent: Sep. 11, 2001

(54) METHOD FOR DETERMINING THE POSITION OF A MOBILE STATION

(75) Inventors: Havish Koorapaty, Raleigh, NC (US); Patrik Nils Lundquist, Stockholm; Anders Carl Erik Hoff, Hagersten, both of (SE)

(73) Assignee: Erksson INC, Research Triangle Park, NC (US)

( * ) Notice: Subject to any disclaimer, the term of this patent is extended or adjusted under 35 U.S.C. 154(b) by 0 days.

(21) Appl. No.: 09/048,545

(22) Filed: Mar. 26, 1998

(51) Int. Cl.[7] .................................................. H04M 11/00
(52) U.S. Cl. ........................ 455/404; 455/435; 455/456
(58) Field of Search ................................. 455/422, 456, 455/457, 458, 404, 434, 435, 33.1; 370/331; 342/450, 451, 452; 701/207

(56) References Cited

U.S. PATENT DOCUMENTS

| | | | |
|---|---|---|---|
| 4,728,959 | | 3/1988 | Maloney et al. ..................... 342/457 |
| 5,579,535 | * | 11/1996 | Orlen et al. .......................... 455/33.1 |
| 5,778,316 | * | 7/1998 | Persson et al. ....................... 455/434 |
| 5,848,063 | * | 12/1998 | Weaver, Jr. et al. ................ 370/33.1 |
| 5,859,612 | * | 1/1999 | Gilhousen ............................ 342/457 |
| 5,873,040 | * | 2/1999 | Dunn et al. .......................... 455/456 |
| 5,884,172 | * | 3/1999 | Sawyer ................................. 455/435 |
| 5,903,844 | * | 5/1999 | Bruckert et al. ..................... 455/456 |
| 5,914,946 | * | 6/1999 | Avidor et al. ........................ 455/423 |
| 5,973,643 | * | 10/1999 | Hawkes et al. ...................... 342/457 |
| 6,009,334 | * | 12/1999 | Grubeck et al. ..................... 455/456 |
| 6,023,492 | * | 2/2000 | Norman ................................ 375/341 |

FOREIGN PATENT DOCUMENTS

| | | |
|---|---|---|
| 0 335 558 A2 | 10/1989 | (EP) . |
| WO97/47148 | 12/1997 | (WO) . |

\* cited by examiner

*Primary Examiner*—Thanh Cong Le
*Assistant Examiner*—Thuan T. Nguyen
(74) *Attorney, Agent, or Firm*—Coats & Bennett

(57) ABSTRACT

The location of a mobile station in a mobile cellular communication system is determined by taking measurements of known transmissions from the mobile station at a plurality of base stations. The serving base station sends a control message to the mobile station to induce the mobile station to transmit a known bit sequence. The known bit sequence transmitted by the mobile station is received at a plurality of base stations. The time of arrival of the known bit sequence at each base station is determined and used to calculate the location of the mobile station.

32 Claims, 4 Drawing Sheets

| INFORMATION ELEMENT | LENGTH(BITS) |
|---|---|
| DOTTING SEQUENCE | 101 |
| WORD SYNC | 11 |
| REPEAT 1 OF WORD 1 | 48 |
| DOTTING SEQUENCE | 37 |
| WORD SYNC | 11 |
| REPEAT 2 OF WORD 1 | 48 |
| DOTTING SEQUENCE | 37 |
| WORD SYNC | 11 |
| ....... | .... |
| REPEAT 5 OF WORD 1 | 48 |
| DOTTING SEQUENCE | 37 |
| WORD SYNC | 11 |
| REPEAT 1 OF WORD 2 | 48 |
| DOTTING SEQUENCE | 37 |
| WORD SYNC | 11 |
| ....... | .... |
| REPEAT 1 OF WORD 2 | 48 |

| INFORMATION ELEMENT | LENGTH(BITS) |
|---|---|
| DOTTING SEQUENCE | 101 |
| WORD SYNC | 11 |
| REPEAT 1 OF WORD 1 | 48 |
| DOTTING SEQUENCE | 37 |
| WORD SYNC | 11 |
| REPEAT 2 OF WORD 1 | 48 |
| DOTTING SEQUENCE | 37 |
| WORD SYNC | 11 |
| ....... | .... |
| REPEAT 5 OF WORD 1 | 48 |
| DOTTING SEQUENCE | 37 |
| WORD SYNC | 11 |
| REPEAT 1 OF WORD 2 | 48 |
| DOTTING SEQUENCE | 37 |
| WORD SYNC | 11 |
| ....... | .... |
| REPEAT 1 OF WORD 2 | 48 |

FIG. 2

METHOD FOR DETERMINING THE POSITION OF A MOBILE STATION

FIELD OF THE INVENTION

The present invention relates generally to methods for determining the position of a mobile station in a cellular communication system, and, more particularly, to a method for determining the location of a mobile station in the AMPS system using the mobile station's transmissions on the reverse control channel and reverse voice channel.

BACKGROUND OF THE INVENTION

The Federal Communications Commission (FCC) has recently promulgated regulations requiring cellular phone operators to provide the location of emergency callers within 125 meters by the year 2001. One way to comply with the new regulations would be for the mobile phone to determine its own location and transmit location data upon placing a "911" call. However, most phones do not have the ability to determine their location. Since the FCC regulations apply to all phones which are in use as of the effective date of the regulations, this method for determining location will not likely be sufficient by itself to comply with the FCC regulations. Notwithstanding the FCC requirement, mobile positioning is desirable for numerous other applications. For example, mobile positioning could be used for fleet tracking. Police or other law enforcement authorities could use mobile positioning to track criminals. Also, individual users can use mobile positioning to determine their own location.

Another method for determining the location of a mobile station is to take measurements of signals transmitted from the mobile station at three or more points and to use such measurements to solve for the position. Various types of measurements could be used to solve for the position of the mobile station including time of arrival (TOA), time difference of arrival (TDOA), or angle of arrival (AOA). While TDOA and AOA measurements can be performed on any signal transmitted by the mobile station, TOA measurements can only be performed on known signals. The performance of TOA is often superior to TDOA and hence, it is desirable to make measurements on known signals whenever possible.

In the AMPS system, which is an analog system, the length of known signals transmitted by the mobile station is relatively short. For example, in reverse control channel message transmissions, most of the message bits are unknown except the first 48 bits. Because the length of the known signals is small, it is difficult to perform TOA measurements which are preferred for calculating the location of the mobile station.

Accordingly, there is a need for a new method for determining the position of a mobile station from the mobile station's transmissions in the AMPS system.

SUMMARY OF THE INVENTION

The present invention is a method for determining the location of a mobile station based on transmissions from the mobile station. When the mobile station places an emergency call or any other call requiring positioning is made either by the mobile station or by the network, the nature of the call is identified at the base station serving the mobile station. Several base stations in neighboring cells are alerted and ordered to monitor the frequency to which the mobile station is assigned. The serving base station sends a control message to the mobile station which induces the mobile station to transmit a known bit sequence. The serving base station and neighboring base stations make measurements on the known bit sequence transmitted by the mobile station. The measurements include the time of arrival of the known bit sequence at each of the base stations. The time measurements made by each of the base stations are forwarded to a mobile positioning center which calculates the position of the mobile station using well known algebraic techniques.

In the preferred embodiment of the invention, each base station obtains a quality estimate of the measurements made at that base station. This estimate could be the signal quality of the transmissions from the mobile station. The measurement quality estimates are forwarded to the mobile positioning center along with the time measurements. The mobile positioning center uses the measurement quality estimates to perform a quality check. If the measurement quality is not sufficient to obtain the desired degree of accuracy in the calculation of the mobile station location, the measurement process is repeated. To repeat the measurement process, the mobile positioning center commands the serving base station to repeat the control message. After repeating the control message, the serving base station and neighboring base stations again take measurements on the confirmation from the mobile station and send the new measurements to the mobile positioning center. This process is repeated as many times as necessary until the desired degree of accuracy is obtained. After calculating the position of the mobile station, the mobile positioning center transmits the mobile station's location to the emergency call center, or to any other application requesting the position of the mobile station.

BRIEF DESCRIPTION OF THE DRAWINGS

FIG. 2 is an illustration showing the format of reverse voice channel message in the AMPS system.

DETAILED DESCRIPTION OF THE INVENTION

Figure 1:
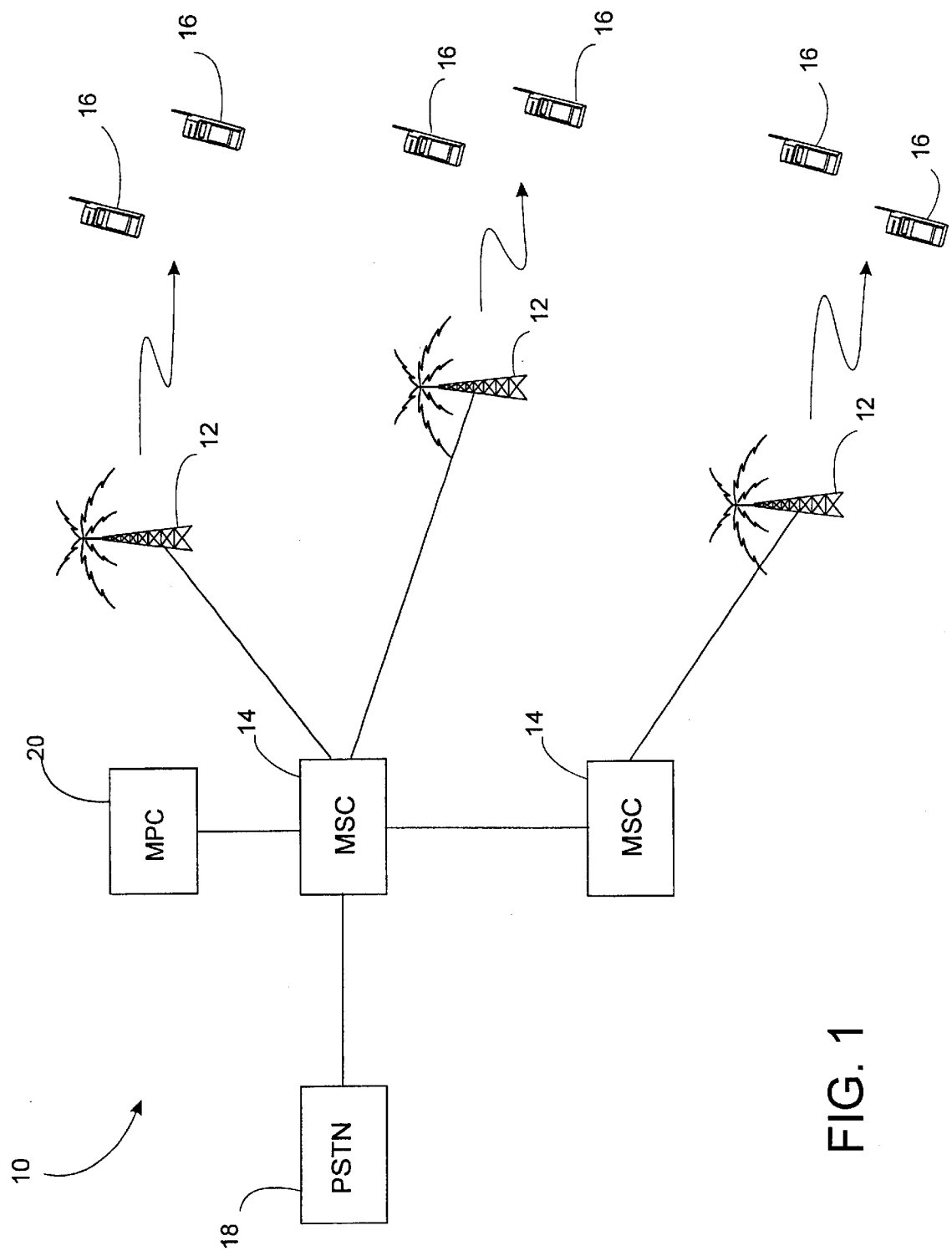
FIG. 1 is a schematic diagram illustrating the architecture of a typical cellular communication system.

Referring now to the drawings, the location method of the present invention will be described. The locationing method of the present invention is used in a cellular communication system as shown in FIG. 1. The cellular communication system, which is indicated generally by the numeral 10, comprises a plurality of base stations 12 which are connected by one or more mobile services switching centers (MSC) 14 to a terrestrial communications network such as the Public Switched Telephone Network (PSTN) 18. Each base station 12 is located in and provides service to a geographic region referred to as a cell. In general, there is one base station 12 for each cell within a given system. Within each cell, there may be a plurality of mobile stations 16 that communicate via radio link with the base station 12. The base station 12 allows the user of the mobile station 16 to communicate with other mobile stations 16, or with users connected to the PSTN 18. The mobile services switching centers 14 route calls to and from the mobile stations 16 through the appropriate base station 12.

A mobile positioning center (MPC) 20 is connected to an MSC 14. When an emergency call is placed by a mobile station 16 or an application requests the position of the mobile station 16, the base stations 12 nearest the mobile station 16 take measurements of signals transmitted by the mobile station 16. These measurements are then forwarded to the MPC 20 via the MSC 14. The MPC 20 uses the measurements from the base stations 12 to calculate the position of the mobile station 16.

In the AMPS system, the available spectrum is divided into a plurality of communication channels using Frequency Division Multiple Access (FDMA). Under this access scheme, each channel consists of a distinct frequency band. Only one mobile station 16 in a given cell can use a given channel or frequency at a time, but the same channel or frequency can be reused in other cells. The channels or frequencies are allocated among the cells in the network so as to maximize reuse of the channels while maintaining an acceptable level of co-channel interference.

Two types of communication channels are used for communications—control channels and traffic channels. Control channels are used to carry control and signaling messages that are needed to maintain the communications link. Traffic channels are used primarily to carry voice and data signals, although some control messages may be sent on the traffic channel.

When the mobile station 16 is engaged in a call, the base station 12 sends control messages to the mobile station 16 on the Forward Voice Channel (FVC) to carry out a number of call processing functions such as directing the mobile station 16 to change frequency i.e., to hand off. The mobile station 16 responds to the control messages by supplying any requested information or by acknowledging the base station's order. This information is sent on the Reverse Voice Channel (RVC). The length of the control message response depends on the nature of the control message received by the mobile station 16. In general, the control message response consists of one or two coded message words that are 48 bits long. The control message response is typically repeated five times. Before each repetition of the message word, a 37-bit dotting sequence and an 11-bit word sync sequence is sent prior to the repeat message. On the first transmission, the dotting sequence is 101 bits long. Therefore, the reverse voice channel message transmissions are either 544 or 1024 bits long. Since the transmission rate is approximately 10 kbps, the reverse voice channel messages will be approximately 54.4 ms or 102.4 ms in length, respectively. The general format of the reverse voice channel messages is shown in FIG. 2.

The present invention uses control message responses transmitted by the mobile station 16 on the reverse voice channel (RVC) to determine the location of the mobile station 16. To briefly summarize, when the mobile station 16 places an emergency call or the position of the mobile station 16 is requested by some other application, the base station 12 will send a command to the mobile station 16 which will cause the mobile station 16 to transmit a known message sequence. Before transmitting the command to the mobile station 16, several base stations 12 in surrounding cells are alerted and commanded to listen for the mobile station's response. When locating signal from the mobile station 16 is received at each of the base stations 12, measurements of the signal, such as time of arrival measurements, are made. The base stations 12 then send the measurements to the MPC 20 which uses the measurements to calculate the location of the mobile station 16.

In the preferred embodiment of the invention, a standard control message is sent from the serving base station 12 to the mobile station 16. The mobile station 16 responds to the control message with a corresponding control message response. A control message is selected so that the control message response from the mobile station 16 is known a priori. Many different types of control messages can be used to induce a known control message response from the mobile station 16. Three control messages which are particularly useful for this purpose are the audit message, change power message, and serial number request message.

When the mobile station 16 receives an audit message from the base station 12, it sends an order confirmation message back to the base station 12 and remains in the conversation mode. IS-136.2-A, Section 2.6.4.4. The order confirmation message is 54.4 ms long. All the bits in the order confirmation message are known to the serving base station 12.

Upon receiving a change power message, the mobile station 16 adjusts its power level to the power level indicated in the message and then transmits an order confirmation message to the base station 12. IS-136.2-A, Section 2.6.4.4. Again, the order confirmation message is 54.4 ms in length. The order confirmation message contains an acknowledgement of the power level to which the mobile station 16 switched. Since the serving base station 12 knows what power level it ordered the mobile station 16 to change to, the bits in the message are completely known to the base station 12. One advantage of using this message is that it is possible to simultaneously set the power level of the mobile station 16 to the highest possible level so that the measurements can be more easily made.

When the mobile station 16 receives a serial number request message, the mobile station 16 responds by transmitting a serial number response message that is 102.4 ms in length. IS-136.2-A, Section 2.6.4.4. The serial number response message contains the ESN of the mobile station 16. Since the ESN of the mobile station 16 is sent by the mobile station 16 to the base station 12 during call origination, the bits of the serial number response message are known in advance by the base station 12. One advantage of using the serial number request message is that it provides a long sequence of known bits on which to take measurements.

Although several different types of control messages have been described which can be used to induce the transmission of known bit sequences from the mobile station 16, it should be understood that many different types of control messages could be used. Thus, the examples given are for illustrative purposes only and are not to be considered to be limiting. The particular examples used herein are advantageous because these signals are already part of the signaling protocols used by existing phones and they result in long transmissions of known bits. Thus, the present invention can be easily implemented without reprogramming phones or changing the protocols used by existing phones.

Using the control messages described above, the serving base station 12 can induce transmissions of long known sequences from the mobile station 16 whenever desired. Once measurements are taken, each base station 12 sends the measurements to the MPC 20 which uses the measurements to solve for the location of the mobile station 16. As previously indicated, the measurements taken by the base stations 12 may be time of arrival (TOA), time difference of arrival (TDOA), or angle of arrival (AOA). In the preferred embodiment of the invention, the time of arrival is the preferred measurement for calculating the location of the mobile station 16.

The procedure for using time of arrival to calculate the location of the mobile station 16 is well known to those skilled in the art. To briefly summarize, the coordinate position can be expressed as a function of the time it takes the signal to travel from the mobile station 16 to the base station 12. This relationship is expressed as follows:

$$tC = \sqrt{(1\, x_{BS-x)} + (y_{BS-y})^2} \quad \text{Eq.(1)}$$

where t is the time it takes the transmission from the mobile station to reach the base station 12, c is the speed of light, (x,y) is the coordinate position of the mobile station 16, and ($X_{BS}$,$Y_{BS}$) is the coordinate position of the base station 12. The transmission time is equal to the difference between the time of arrival of the signal at the base station 12 and the time the signal was transmitted from the mobile station 16. Thus, Equation 1 can be rewritten as follows:

$$(t_R - t_T)c = \sqrt{(x_{BS-x})^2 + (y_{BS-y})^2} \text{Eq.} \quad (2)$$

where $t_R$ is the time the signal is received at the base station 12 and $t_T$ is the time the signal was sent by the mobile station 16. Equation 2 has three unknowns: time of transmission $t_T$, the x-coordinate of the mobile station 16, and the y-coordinate of the mobile station 16. If measurements are taken at three base stations 12, three equations can be generated with the same three unknowns in each equation. In each equation, the values for receive time $t_R$, base station x coordinate, and base station y coordinate will be different. These equations can be solved using known algebraic techniques to obtain the x and y coordinate of the mobile station 16.

It should be noted that three independent equations may also be generated using two base stations by performing two types of measurements at either of the base stations. For example, two base stations would be used if one of the base stations performs angle of arrival measurements in addition to time of arrival measurements.

To ensure accuracy of the calculations, the base stations 12 may take quality estimates of the measurements made on the signal received from the mobile station 16. For example, the base station 12 may measure the received signal strength (RSSI) of the signal received from the mobile station 16. The signal quality measurements are transmitted to the MPC 20 along with the time measurements that are used for the position calculations. RSSI information is contained in a Channel Quality Message (CQM) transmitted from the mobile station 16 to the base station 12. The procedure for reporting RSSI is described in IS-136.2, Section 2.4.5.4.1.2 which is incorporated herein by reference.

The MPC 20 may use the measurement quality estimates to perform a quality check. If the signal quality is not sufficient to obtain the desired degree of accuracy in the calculation of the mobile station's position, the measurement process can be repeated. For instance, a measurement standard deviation of less than 150 meters may be sufficient for performing position calculations. To repeat the measurement process, the MPC 20 would command the serving base station 12 to repeat the control message. After repeating the control message, the serving base station 12 and surrounding base stations 12 would again take measurements on the control message response from the mobile station 16 and pass the new measurements to the MPC 20. This process can be repeated as many times as necessary until the desired degree of accuracy is obtained. After calculating the position of the mobile station 16, the MPC 20 transmits the mobile station's location to the emergency call center or other application processing center requiring position of the mobile station 16. In another aspect of the invention, the serving base station 12 may transmit combinations of different control messages to induce better and longer responses from the mobile station 16. For example, the base station 12 may send a change power message instructing the mobile station 16 to transmit at the highest power level followed by a series of serial number request messages. This technique would provide the best possible signal to noise ratio as well as a long measurement time.

Figure 3A:
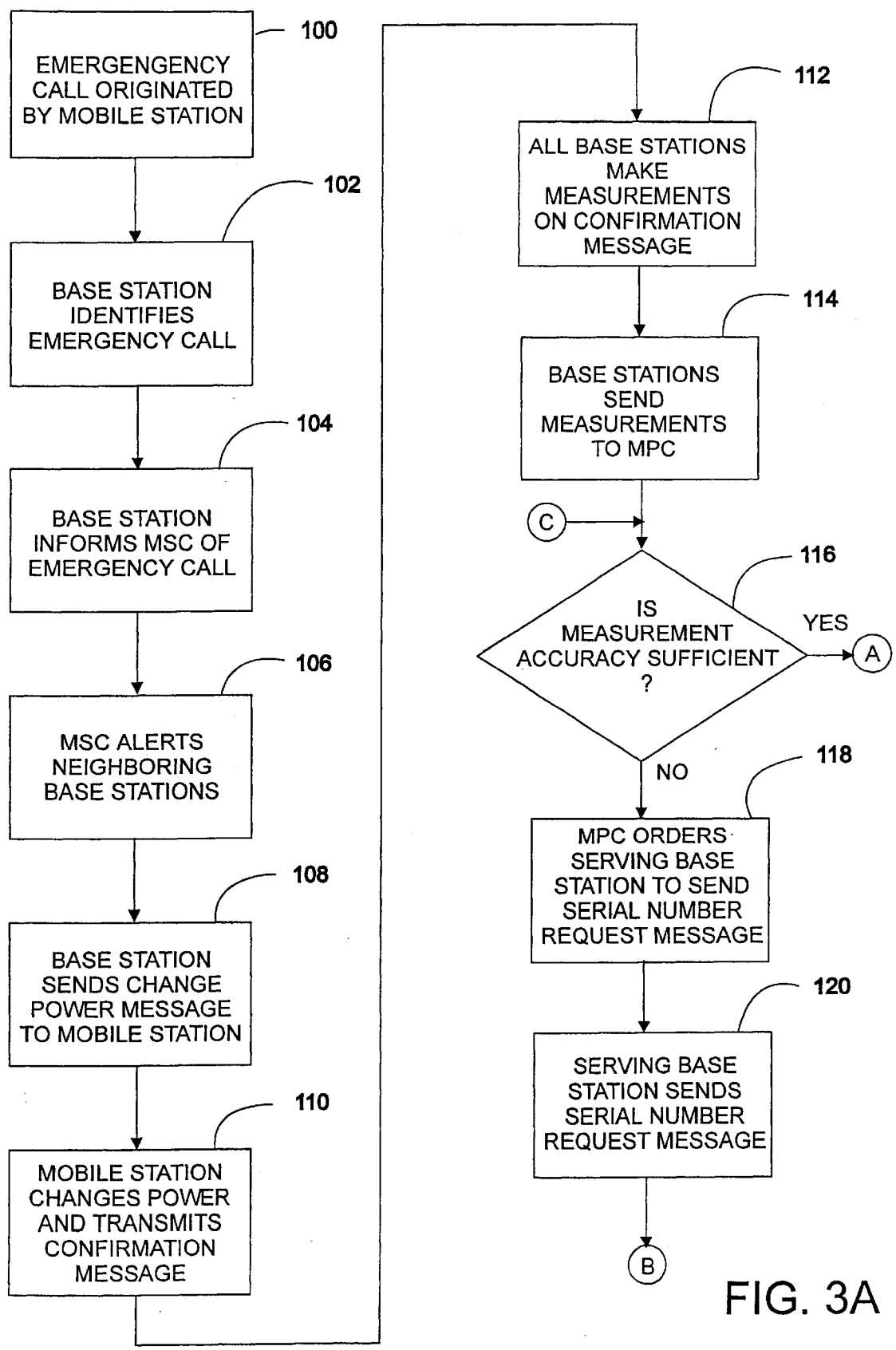
FIGS. 3A and 3B are a flow diagram illustrating the positioning method of the present invention.
Figure 3B:
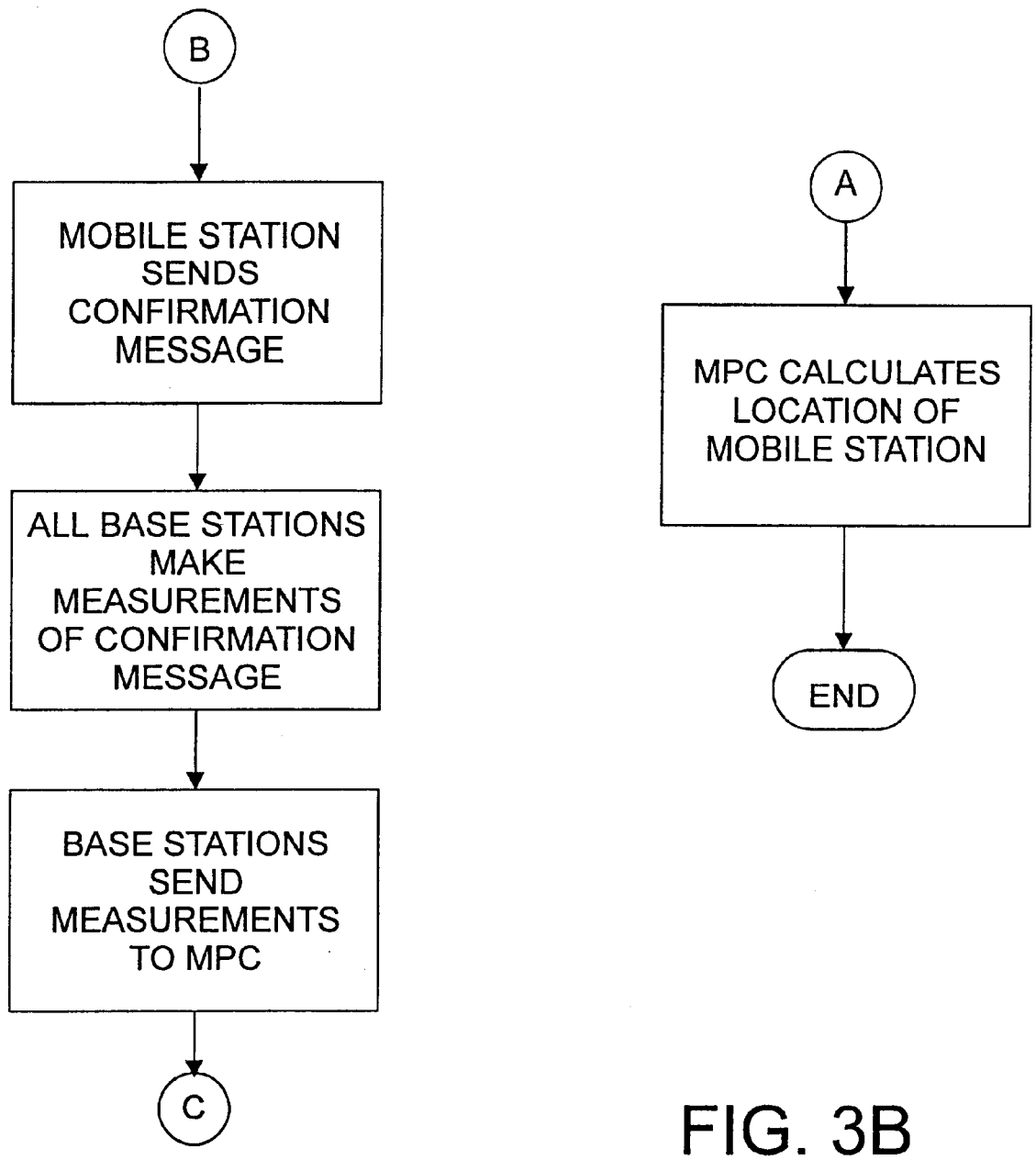

FIGS. 3A and 3B are a flow diagram illustrating one embodiment of the position location method of the present invention. The location method of the present invention is initiated when the mobile station 16 places an emergency call or "911" call (block 100) or when some application in the network requests the position of the mobile station 16. The mobile station 16 could also initiate the location method to ascertain its own position. For an emergency call, the mobile station 16 sends a call origination message to the base stations 12 that includes the number being called. The base station 12 is able to differentiate emergency calls from other calls by the number being called. When a call requiring positioning is identified (block 102), the serving base station 12 performs the call set-up procedure and assigns the mobile station 16 to a communication channel. The serving base station 12 then informs MSC 14 that an emergency call has been received (block 104). The MSC 14 in turn notifies neighboring base stations 12 in two or more surrounding cells to be alert for transmissions from the mobile station 16 (block 106). The neighboring base stations 12 are further informed of the channel on which the transmissions will be made. The serving base station 12 sends a change power message to the mobile station 16 requesting transmission at the highest power level (block 108). The neighboring base stations 12 are ordered to make measurements on the confirmation message sent by the mobile station 16. After the mobile station 16 changes its power level, it transmits an order confirmation message on the assigned channel (block 110). All the base stations 12 make measurements on the order confirmation message and forward the measurements to the MPC 20 (block 112 and 114). The information transmitted to the MPC 20 includes measurement quality estimates for the measurements made on the signal received from the mobile station 16. Based on the signal quality measurements, the MPC 20 determines whether the location of the mobile station 16 can be calculated with sufficient accuracy (block 114). If not, the MPC 20 orders the serving base station 12 to send a serial number request message to the mobile station 16 and orders all the base stations 12 to take measurements of the serial number response from the mobile station 16 (block 118). When the serving base stations 12 sends a serial number request to the mobile stations 16 (block 120) the mobile station 16 sends a serial number response (block 123), the base stations 12 take measurements (block 121) and forward the measurements to the MPC 20 (block 126). The MPC 20 again determines whether the position of the mobile station 16 can be calculated with sufficient accuracy (block 116). If not, the serving base station 12 is again ordered to repeat the serial number request message (block 118) and all base stations 12 take measurements on the confirmation message. This process is repeated until the desired signal quality is obtained. Once the desired signal quality is obtained, the MPC 20 use the measurements to calculate the position of the mobile station 16 (block 128). The position of the mobile station 16 is then forwarded to an emergency call center or other application processing center which notifies the emergency personnel of the mobile station's location.

What is claimed is:

1. A method for determining the location of a mobile station in a mobile radio communication system including a plurality of base stations, comprising:

inducing the mobile station to transmit a locating signal containing a known bit sequence;

receiving said locating signal at a plurality of selected base stations in said mobile radio communication system;

determining the time of arrival of said locating signal at said selected base stations;

measuring the signal quality of said locating signal received at said selected base stations; and calculating the position of the mobile station based on said time of arrival of said locating signal at said selected base stations, if said signal quality of said locating signal received at said selected base stations meets a desired signal quality.

2. The method according to claim 1 wherein inducing said mobile station to transmit said locating signal comprises transmitting a control message from one of said selected base stations in said mobile radio communication system to said mobile station, wherein said mobile station is programmed to transmit a known response message to said control message.

3. The method according to claim 2 wherein said control message is a reverse voice channel control message in an AMPS system.

4. The method according to claim 3 wherein said control message is an audit message.

5. The method according to claim 3 wherein said control message is a change power message.

6. The method according to claim 5 wherein said change power message is a command to change to the highest power level.

7. The method according to claim 3 wherein said control message is a serial number request message.

8. The method according to claim 1 wherein said base stations are communicatively connected to a mobile positioning center and wherein said time of arrival data is transmitted by said base stations to said mobile positioning center where said location of the mobile station is calculated.

9. The method according to claim 8 wherein said mobile positioning center transmits said location of the mobile station to an emergency center.

10. The method of claim 8 further comprising transmitting signal quality measurements indicative of said quality of said locating signal received at said selected bases stations to said mobile positioning center.

11. A method for determining the location of a mobile station in a mobile radio communication system including a plurality of base stations, comprising:

a) inducing said mobile station to transmit a locating signal containing a known bit sequence;

b) receiving said locating signal at a plurality of selected base stations in said mobile radio communication system;

c) determining the time difference of arrival of said locating signal at said selected base stations, and d) calculating said location of said mobile station based on said time difference of arrival of said locating signal at said selected base stations.

12. The method according to claim 11 wherein the step of inducing said mobile station to transmit a locating signal containing a known bit sequence includes transmitting a control message from one of said selected base stations in said mobile radio communication system to said mobile station, wherein said mobile station is programmed to transmit a known response message to said control message.

13. The method according to claim 12 wherein said control message is a reverse voice channel control message in an AMPS system.

14. The method according to claim 13 wherein said control message is an audit message.

15. The method according to claim 13 wherein said control message is a change power message.

16. The method according to claim 15 wherein said change power message is a command to change to the highest power level.

17. The method according to claim 13 wherein said control message is a serial number request message.

18. The method according to claim 11 wherein said time difference of arrival is transmitted from said selected base stations to a mobile positioning center, and wherein calculating said location of said mobile station based on said time difference of arrival of said locating signal at said selected base stations is performed at said mobile positioning center.

19. The method according to claim 18 wherein the mobile positioning center transmits said location of the mobile station to an emergency center.

20. The method of claim 18 further comprising measuring the signal quality of said locating signal received at said selected base stations.

21. The method of claim 20 further comprising transmitting said signal quality measurements indicative of said quality of said locating signal received at said selected base stations to said mobile positioning center.

22. A method for determining the location of a mobile station in a mobile radio communication system including a plurality of base stations, comprising:

a) inducing the mobile station to transmit a locating signal containing a known bit sequence;

b) receiving said locating signal at a plurality of selected base stations in said mobile radio communication system;

c) determining the angle of arrival of said locating signal at said selected base stations; and d) calculating the position of the mobile station based on said angle of arrival of said locating signal at said selected base stations.

23. The method according to claim 22 wherein the step of inducing said mobile station to transmit a locating signal containing a known bit sequence includes transmitting a control message from one of said selected base stations in said mobile radio communication system to said mobile station, wherein said mobile station is programmed to transmit a known response message to said control message.

24. The method according to claim 23 wherein said control message is a reverse voice channel control message in an AMPS system.

25. The method according to claim 24 wherein said control message is an audit message.

26. The method according to claim 24 wherein said control message is a change power message.

27. The method according to claim 26 wherein said change power message is a command to change to the highest power level.

28. The method according to claim 24 wherein said control message is a serial number request message.

29. The method according to claim 22 wherein said angle of arrival is transmitted from said selected base stations to a mobile positioning center, and wherein calculating said location of said mobile station based on said angle of arrival of said locating signal at said selected base stations is performed at said mobile positioning center.

30. The method according to claim 29 wherein the mobile positioning center transmits said location of the mobile station to an emergency center.

31. The method of claim 18 further comprising measuring the signal quality of said locating signal received at said selected base stations.

32. The method of claim 31 further comprising transmitting said signal quality measurements indicative of said quality of said locating signal received at said selected base stations to said mobile positioning center.

* * * * *

UNITED STATES PATENT AND TRADEMARK OFFICE
CERTIFICATE OF CORRECTION

PATENT NO.    : 6,289,211 B1
DATED         : September 11, 2001
INVENTOR(S)   : Havish Koorapaty, Patrick Nils Lundqvist and Anders Carl Erik Hoff It is certified that error appears in the above-identified patent and that said Letters Patent is hereby corrected as shown below:

<u>Title page,</u>
The second inventor's last name, "Lundquist", should be -- Lundqvist --.
The Assignee, "Erksson INC", should be -- Ericsson Inc. --.

Signed and Sealed this

Twenty-first Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,289,211 B1 | |
| APPLICATION NO. | : 09/048545 | |
| DATED | : September 11, 2001 | |
| INVENTOR(S) | : Koorapaty et al. | |

It is certified that error appears in the above-identified patent and that said Letters Patent is hereby corrected as shown below:

Title Page, item [75]:
    The second inventor's last name, "Lundquist", should be -- Lundqvist --.
    item [73] The Assignee, "Erksson, INC", should be -- Ericsson Inc. --.

Signed and Sealed this

Fifteenth Day of August, 2006

JON W. DUDAS
*Director of the United States Patent and Trademark Office*